Patented Aug. 3, 1926.

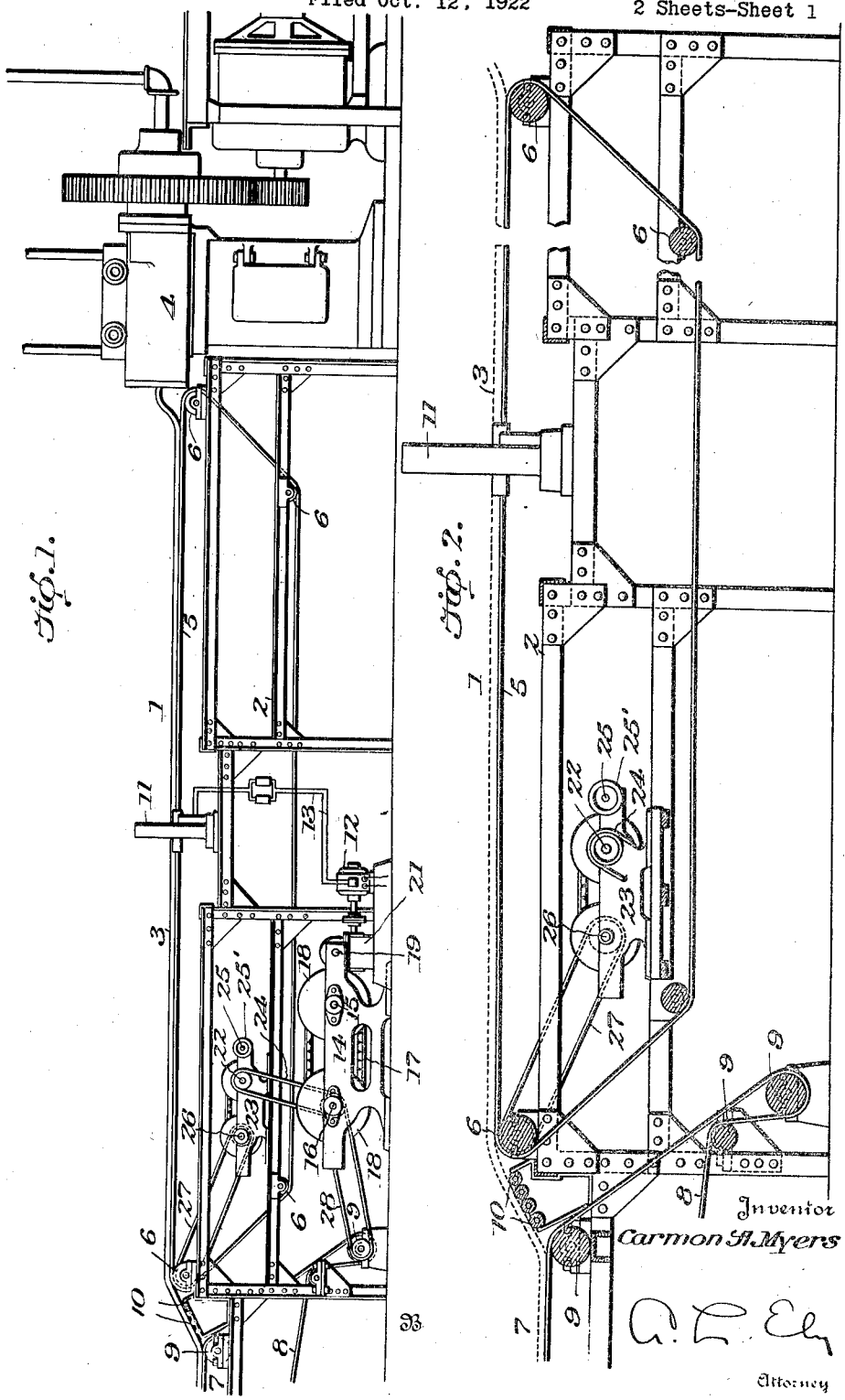

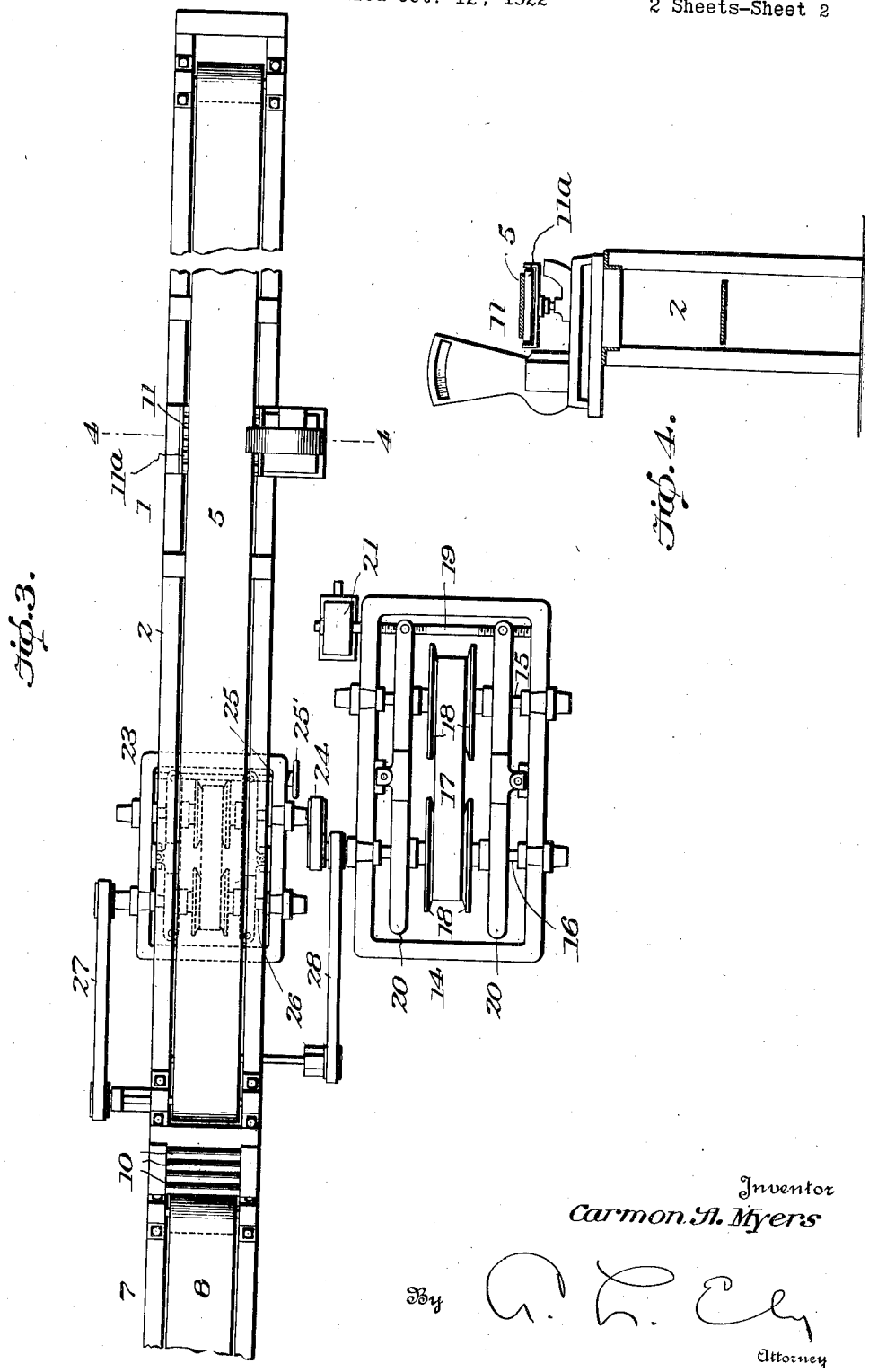

1,594,845

UNITED STATES PATENT OFFICE.

CARMON A. MYERS, OF AKRON, OHIO, ASSIGNOR TO THE FIRESTONE TIRE AND RUBBER COMPANY, OF AKRON, OHIO, A CORPORATION OF OHIO.

METHOD AND APPARATUS FOR TREATING RUBBER.

Application filed October 12, 1922. Serial No. 594,137.

My invention relates to methods of treating rubber and to apparatus for use in practicing the method and it has particular reference to the formation of rubber strips for use in the manufacture of treads for pneumatic tires, although the principles of the invention may be applied to other uses.

As a tread strip issues from a die, it will vary in weight owing to differences in the character of the rubber or other causes beyond the control of the operator. In prior practice it has been customary to run the strip out onto a traveling belt which is speeded up faster than the speed of the tread issuing from the tubing machine so as to elongate the strip slightly if it is coming too heavy, or to retard the belt to compress the strip if it is coming too light. These variations in speed of the belt have heretofore been performed by the tubing machine operator, and it is the purpose of the present invention to construct an apparatus whereby the changes in speed of the receiving belt from the tube machine take place automatically.

By this means I am enabled to more accurately take care of variations in the speed of the receiving belt and the machine is instantly responsive to changes as they take place in the tubing operation. Thus results are accomplished which were impossible of accomplishment under the old hand method of adjustment.

It is also the purpose of this invention to combine with the automatic regulating device as set forth, a second belt arranged to obtain compression in the rubber strip to compensate for subsequent shrinkage, as set forth in the prior patent to William H. Bines, No. 1,400,137, dated December 13, 1921.

Specifically, I propose to treat a strip of rubber as it issues from an extruding machine to compress or elongate it in accordance with its weight, so that it is of uniform density and size throughout its entire length, and to then compress it uniformly throughout its entire length.

The objects and advantages of my invention will appear when the following description is read in conjunction with the accompanying drawings wherein I have illustrated one practical form of apparatus for carrying out my improved method.

In the drawings:

Figure 1 is a side elevational view illustrating, conventionally, an extruding machine and my preferred form of apparatus associated therewith;

Figure 2 is a longitudinal sectional view, on an enlarged scale, through a portion of my apparatus;

Figure 3 is a plan view of my apparatus; and

Figure 4 is a transverse sectional view, on an enlarged scale, taken on the line 4—4 of Figure 3.

In practicing my method, I convey the strip of rubber material from an extruding machine and I weigh the strip and retard or accelerate the speed at which it is conveyed relative to the speed at which it issues from the machine in accordance with its weight. I thereby compress or elongate the strip and secure a uniform density and weight throughout its entire length. After this result has been accomplished, I subject the strip to a uniform degree of compression throughout its entire length to compensate for the subsequent shrinkage, the compression being effected progressively throughout successive portions of the strip.

The form of apparatus which I have illustrated for practicing this method comprises a primary conveyor, designated 1 in the drawings, which is suitably supported upon a framework 2 to receive a strip of material 3 from an extruding machine 4. The extruding machine 4 may be of any suitable design arranged to express a strip of rubber through a heated die and to impart to the strip the general cross-sectional form of a tire tread or other form as may be required. Such machines being well known in the art need no further description. The conveyor 1 is arranged to convey the strip 3 in the direction in which it is extruded from the machine 4 and comprises an endless horizontal belt 5 supported upon suitably arranged rollers 6, of which one is a driving roller, and discharging upon a secondary conveyor 7. The conveyor 7 also comprises an endless horizontal belt 8 supported upon suitable rollers such as those illustrated at 9, one of which is a driving roller. The conveyor 7 is arranged somewhat below the conveyor 1 and in longitudinal alignment therewith, so that the strip 3 will descend from the latter onto the former and be conveyed therefrom. Between the conveyors 1 and 7, a plurality of idler rollers 10 are arranged in an inclined plane to guide the strip from one conveyor to the other.

The conveyor 1 is designed to be driven at a ratio of speed relative to the speed at which the strip issues from the machine 4 that is governed by the weight of the issuing strip. This result is accomplished in the following manner: A weighing device, such as a platform scale 11, is suitably mounted beneath and supports a portion of the upper run of the conveyor 1 by rollers 11ª. The platform is arranged so as to be electrically connected to a motor 12, so that the motor is stopped when the platform is stationary, and started or reversed when the platform is raised or lowered by the variations in the weight of the strip as it is conveyed thereover. Any suitable arrangement of circuits and relay switches, such as that indicated at 13, may be utilized, but inasmuch as this feature forms, per se, no part of the present invention no detailed showing thereof has been incorporated in the drawings.

The conveyors 1 and 7 are driven through a variable transmission device 14 of any type, preferably that known as "The Reeves variable speed transmission," which comprises, briefly, a constantly driven shaft 15 and a variably driven shaft 16, that are connected together to vary the ratio of speed of the shafts by a belt 17 and cone pulleys 18. The pulleys 18 are arranged in pairs upon each shaft and the pulleys of each pair are relatively adjustable upon their respective shaft to change the ratio of speed of the shafts. This adjustment is effected by means of a screw shaft 19 connected at its ends with swinging levers 20 to move the pulleys of each pair in reverse directions upon their shafts 15 and 16. This device is well known in the art and therefore will not be described in further detail herein. It is sufficient to say that the motor 12 is connected through a speed reducing device 21 to the screw shaft 19 of one of these devices to vary the speed of its driving shaft 16 relative to its driven shaft 15 as the speed of the motor 15 is retarded or accelerated in accordance with the action of the scales 11. The driven shaft of the device 14 constitutes the main driving shaft of the machine and may be connected to any suitable source of power.

The shaft 16 is also connected in driving relation to the driven shaft 22 of a second similar, variable speed device 23, as by the belt 24. The adjusting shaft 25 of the device 23 is equipped with a hand wheel 25' whereby the ratio of speeds of its driven shaft 22 and its driving shaft 26 may also be varied. The driving shaft 26 of the device 23 is connected by a belt 27 with one of the driving rollers 6 of the conveyor 1. The shaft 16 is also connected to the driving roller 9 of the conveyor 7 by the belt 28. Obviously as the ratio of speeds of the shaft 16 varies relative to that of the shaft 15 in accordance with the action of the motor 12 and the scales 11, the conveyors 1 and 7 will together be retarded or accelerated. This action of the conveyor 1 serves to elongate or compress the strip 3 as it issues from the die in accordance with variations in its weight to maintain a uniform weight and size throughout the full length of the strip.

The conveyor 1 is, however, driven at a faster speed relative to the speed of the conveyor 7, whereby as the strip leaves the former, it is compressed on the rollers 10. This speed at which the conveyor 1 should be driven relative to that of the conveyor 7, in order to secure the proper degree of compression of the strip is, of course, determined by the character or composition of the strip. Any ratio of speed between the conveyors 1 and 7 may be secured and maintained through the device 23 by manipulating the hand wheel 25' to vary the speed of the shaft 26 relative to that of the shaft 16 of the device 14, as will be apparent without further explanation.

Obviously the principles of my invention may be embodied in different physical forms and the steps of my method may be varied without departing from the spirit of my invention.

It is, therefore, to be understood that the present disclosure is illustrative and is not to be construed as imposing any limitations upon my invention unless such limitations are warranted by the prior art and the scope of the claims appended hereto.

What I claim is:

1. The method of treating rubber comprising, extruding a mass of rubber in strip form, and causing an elongation or linear compression of said strip by the weight thereof.

2. The method of treating rubber comprising, extruding a mass of rubber in strip form, and causing a stretching or compression throughout different portions of the strip by the weight of said different portions.

3. The method of treating rubber comprising, extruding a mass of rubber in strip form, elongating the strip by the action of its weight, and subsequently compressing the strip in the direction of its length.

4. The method of treating rubber comprising, extruding a mass of rubber in strip form, causing an elongation or contraction of the strip by the weight thereof, and subsequently compressing the strip in the direction of its length.

5. The method of treating rubber comprising, extruding a mass of rubber in strip form, supporting the strip, and causing a compression or elongation of the strip by the weight thereof as it is being supported.

6. The method of treating rubber comprising, extruding a mass of rubber in strip form, supporting the strip, causing a compression or elongation of the strip by the weight thereof, and subsequently compressing the strip in the direction of its length.

7. Apparatus for treating rubber comprising means for extruding rubber in strip form, and means associated with said first means adapted to be controlled by variations in the weight of the strip for conveying the strip from said extruding means at speeds varying in accordance with said variations in weight.

8. Apparatus for treating rubber comprising, means for extruding the rubber in strip form, means adapted to convey the strip from the first means as it is being extruded, and means for automatically varying the speed of the second means by movement of the strip.

9. Apparatus for treating rubber comprising, conveying means for receiving a strip of rubber, means for feeding a continuous strip thereon, and means for automatically varying the speed of the conveying means by movement of the strip over said conveying means.

10. Apparatus for treating rubber comprising, conveying means for receiving a strip of rubber, means for feeding a continuous strip thereon, and means adapted to automatically vary the speed of the first means in accordance with the variations in weight of different portions of the strip.

11. Apparatus for treating rubber comprising, conveying means for receiving a strip of rubber, means for feeding a continuous strip thereon, means for automatically varying the speed of the first means by movement of the strip thereover, and means for compressing the strip as it leaves said first means.

12. In apparatus of the class described, in combination, an extruding device for forming a continuous rubber strip, cooperating conveyors for transporting the strip away from said device, means for operating the conveyors at relatively different speeds, and means for varying the speed of the conveyors at a fixed ratio by movement of the strip thereover.

13. In apparatus of the class described, in combination, an extruding device for forming a continuous rubber strip, cooperating conveyors for transporting the strip away from said device, a common driving mechanism for operating the conveyors at relatively different speeds, means for varying the ratio of speed of said conveyors, and means for retarding or accelerating the speed of the conveyors while maintaining a fixed ratio therebetween said last means being actuated by movement of the strip.

14. In apparatus of the class described, in combination, an extruding device for forming a continuous rubber strip, cooperating conveyors for transporting the strip away from said device, means for operating the conveyors at relatively different speeds, and means for automatically varying the speed of the conveyors while maintaining a fixed ratio therebetween.

15. In apparatus of the class described, in combination, an extruding device for forming a continuous rubber strip, cooperating conveyors for transporting the strip away from the device, means for operating the conveyors at relatively different speeds, and means for varying the speed of the conveyors while maintaining a fixed ratio therebetween adapted for operation by variations in weight in said strip.

16. In apparatus of the class described, in combination, an extruding device for forming a continuous rubber strip, cooperating conveyors for transporting the strip away from the device, means for operating the conveyors at relatively different speeds, means for varying the speed of the conveyors while maintaining a fixed ratio of speed therebetween adapted for operation by the variations in weight in said strip, and means for varying the ratio of speed of said conveyors.

17. Apparatus of the class described comprising, in combination, means for extruding a continuous strip of rubber, a conveyor for moving the strip relative to said means, means for progressively weighing the strip, and means for operating the conveyor adapted to vary the speed thereof in accordance with variations in weight of said strip.

18. Apparatus of the class described comprising, in combination, means for extruding a continuous strip of rubber, a conveyor for moving the strip relative to said means, means for progressively weighing the strip as it is moved by said conveyor, operating means for said conveyor adapted to vary the speed thereof in accordance with variations in weight of said strip, a second conveyor, and a driving connection between said operating means and the second conveyor.

19. Apparatus of the class described comprising, in combination, means for extruding a continuous strip of rubber, a conveyor for moving the strip away from said means, means for progressively weighing the strip as it is moved, operating means for the conveyor adapted to vary the speed thereof in accordance with variations in weight of said strip, means for varying the speed of the conveyor relative to that of said operating means, a second conveyor, and a driver connection between said second conveyor and said operating means.

20. Apparatus of the class described comprising, in combination, means for extruding a continuous strip of rubber, a conveyor for moving the strip away from said means, operating means for the conveyor adapted to vary the speed thereof in accordance with variations in weight of said strip, means for varying the speed of the conveyor relative to that of the operating means, a second conveyor, and a driving connection between said second conveyor and said operating means.

CARMON A. MYERS.